US005971104A

United States Patent [19]

Woller

[11] Patent Number: 5,971,104

[45] Date of Patent: Oct. 26, 1999

[54] CLIMBING TREE STAND

[75] Inventor: Ronald R. Woller, Decatur, Ala.

[73] Assignee: Summit Specialties, Inc., Decatur, Ala.

[21] Appl. No.: 08/582,885

[22] Filed: Jan. 4, 1996

[51] Int. Cl.[6] ........ A47C 9/10

[52] U.S. Cl. ........ 182/136; 182/135; 182/187; 182/188

[58] Field of Search ........ 182/135, 136, 182/187, 188; 472/118; 297/452.1, 467, 273

[56] References Cited

U.S. PATENT DOCUMENTS

| | | | |
|---|---|---|---|
| 135,018 | 1/1873 | Strassle | 297/276 |
| 1,340,940 | 5/1920 | Medart | 472/118 |
| 4,017,071 | 4/1977 | Wright | 272/85 |
| 4,164,350 | 8/1979 | Zeijdel et al. | 272/70 |
| 4,382,595 | 5/1983 | Tolar | 272/85 |
| 4,417,645 | 11/1983 | Untz | 182/135 |
| 4,452,338 | 6/1984 | Untz | 182/136 X |
| 4,478,409 | 10/1984 | Eads et al. | 272/85 |
| 4,722,521 | 2/1988 | Hyde et al. | 272/86 |
| 4,948,120 | 8/1990 | Krueger et al. | 272/85 |
| 5,052,516 | 10/1991 | Jamieson | 182/135 |
| 5,090,505 | 2/1992 | Amacker | 182/136 X |
| 5,161,522 | 11/1992 | Clevenger | 128/25 R |
| 5,197,730 | 3/1993 | Ask | 472/118 |
| 5,235,077 | 8/1993 | Sheriff | 182/136 X |
| 5,374,107 | 12/1994 | Schnitzler | 297/273 |
| 5,376,053 | 12/1994 | Ponder et al. | 472/119 |
| 5,533,934 | 7/1996 | Miller | 472/118 |
| 5,624,321 | 4/1997 | Snyder | 472/118 |

*Primary Examiner*—Ramon O. Ramirez
*Assistant Examiner*—Long Dinh Phan
*Attorney, Agent, or Firm*—Gardner & Groff, P.C.

[57] ABSTRACT

A climbing tree stand includes a detachable, reversible seat assembly suspended from the body support structural frame. The seat assembly itself has a seat bottom portion and a back support portion connected to the seat and operable to bear against a transverse portion of the structural frame. A pair of straps attached to the bottom of the seat bottom portion carry hooks at their ends which hooks engage sides of the frame assembly so as to suspend the seat assembly below the frame assembly.

9 Claims, 6 Drawing Sheets

CLIMBING TREE STAND

BACKGROUND AND SUMMARY OF THE INVENTION

The present invention relates generally to climbing tree stands for use by sportsmen. More particularly, the present invention concerns a climbing tree stand having a reversible detachable seat assembly.

Tree stands in general, and climbing tree stands in particular are known which provide portable and elevatable observations platforms for sportsmen for photography, hunting, and elevated observation of wild life in its natural habitat. Generally, some sort of seat arrangement is provided on the tree stand to permit the sportsman to assume a seated posture which is plainly more comfortable than standing for long periods. Ordinarily, the known seat arrangements dictate whether the sportsman will face the tree or vertical support or face away from the tree or vertical support.

When climbing a tree, a seat facing the tree is advantageous since it can be used by the sportsman to ease the physical effort involved in jacking the stand up the tree. On the other hand, when in the elevated position, it is advantageous to face away from the tree since the tree itself tends to obstruct the field of view. There is, therefore, a tension between the two seat possible seat orientations that must be settled by the designer of the climbing tree stand. Moreover, when the orientation is selected, the sportsman generally has little opportunity to change the orientation. Even in those arrangements where a sportsman or user can change the seat orientation, it is ordinarily necessary to disassemble the seat from the tree stand so that the seat orientation can be changed. If that task is effected in the elevated position, there is considerable risk that fasteners or parts of the seat can fall to the ground, with the possibility that small parts are lost, and with the result that reattachment of the seat is difficult if not impossible until the missing parts are retrieved.

For example, in one known device, the seat comprises a board which is attached to a frame by bolts and wing nuts. To move the seat to a different position on the frame, the bolts and wing nuts must be disassembled at one position and reassembled in a new position. When done at an elevated location, it is very easy to drop either the bolts or the wing nuts, or both. Should the seat still be used, without proper fastening, then there is a risk of injury to the sportsman or user.

In another known arrangement, a seat is fashioned from a mesh fabric and slidably attached to sides of a frame. To move the seat from one position to another, that is adjacent to the tree or remote from the tree, the sportsman or user must step up over the mesh and reposition the seat. Stepping over an elevated seat, at an elevated location, creates an awkward and potentially unsave situation—a situation which can be exacerbated when the sportsman also has binoculars and/or a firearm on the elevated platform.

A climbing tree stand which overcomes problems with the prior art devices includes a body-support assembly and foot-support assembly. The body-support assembly includes a tubular support frame and a detachable, reversible seat assembly which is removable from the tubular support frame without removal of fasteners. The tubular support frame includes a U-shaped portion which is generally planar and having a tree-engaging assembly at one end. The seat assembly is positioned at a second end of the U-shaped portion of the support frame. Furthermore, the seat assembly includes a seat bottom, a seat back attached to the seat bottom, and a pair of flexible straps which suspend the seat bottom from generally parallel sides of the tubular support frame. The flexible straps are attached to a steel hook provided for attachment to each side of the tubular frame structure.

At the first end of that tubular frame structure, a tree-engaging arrangement is provided. That tree-engaging arrangement includes a pair of generally parallel arms that extend from the planar portion of the frame structure so as to straddle the vertical support. Those arms are inclined upwardly in the direction away from the U-shaped frame structure. A locking bar is adjustably connected to the arms and extends between the arms so that the tree is positioned within the perimeter of the frame structure. In addition, the tree-engaging arrangement includes an abutment assembly that extends below the plane of the tubular frame so as to engage the tree at a position below the plane of the frame structure. Thus, a knee-accommodating space is defined below the plane of the seat assembly, the space extending from the seat assembly to the tree and being free of obstructions.

Cooperating with the body-support assembly is a foot-support assembly. Ordinarily, the foot-support assembly is disposed below the body-support assembly. Here, the foot-support assembly includes a tubular frame having a first and second ends, a tree-engaging portion being located at the first end. The foot-support assembly is described more fully in U.S. Pat. No. 5,226,505, which is incorporated herein by this reference thereto. For convenient reference, the frame has a foot-support platform at the second end thereof, the foot-support platform defining a second generally horizontal plane. The tree-engaging portion of the foot-support assembly includes a pair of arms extending upwardly above the second horizontal plane so as to embrace the tree at a location above the second generally horizontal plane. In addition, the tree-engaging portion of the foot-support assembly has an abutment member positioned below the second horizontal plane.

By positioning the tree-engaging supports both above and below the generally horizontal plane of the body supporting assembly and the foot-support assembly, respectively, the supporting members are subjected to both compressive, tensile and bending forces. As a result, the combined stresses acting on the members more efficiently use material properties than structures which only subject such members to tension or compression. As a consequence, the resulting tree stand can be fabricated from steel and still be as light as a tree stand fashioned from aluminum. Furthermore by locating the abutment member below the corresponding horizontal plane, greater clearance is provided for the sportsman's knees and legs in the space between the seat and the tree.

Making the present design from steel allows the vertical spacing between the upper latch bar and lower abutment to be smaller than in the case of an aluminum design. That smaller vertical spacing is accomplished due to the material properties and further contributes to a lighter weight design than is results from an aluminum construction.

To enhance the sportsman's comfort while using the climbing tree stand, the frame structure of the body-support unit includes a transverse member which can also function as a back support bar. When the seat assembly is positioned so as to face the tree, the generally vertically extending seat back portion can rest against the transverse member. That seat back portion can be suitably padded between the user's back and the transverse back support portion of the body-support frame.

The seat assembly is attached to the body-support frame using steel hooks. Each hook is preferably coated with plastic material and is fabricated from round bar stock. The plastic coating may have a nominal thickness of about 0.050". The coating is effective to eliminate any artificial or extraneous noise from the metal hook wiggling, or otherwise intermittently contacting the metal frame. Such noise might startle, or otherwise alert game or wildlife being observed while changing the seat from the inward or tree-facing position to the outward or tree-backed seating position. This adjustment is accomplished without the use of threaded fasteners or pins to prevent the hook from becoming disengaged with the body-support frame tubing. The hooks can be arranged such that a four separate connections (one on each end of the two seat supporting straps) attach the seat assembly to the body support frame. Alternatively, two hooks may be used, each hook connected to both straps, one hook being provided on each side of the seat assembly. An intermediately extending span of the steel wire material permits the ends of the straps to be laterally spaced from one another. In the two hook arrangement, each end of the seat support strap is connected to its adjacent seat support hook. The hooks are then attached to the corresponding side of the body-support frame tubing.

BRIEF DESCRIPTION OF THE DRAWINGS

Many objects and advantages of this invention will be apparent to those skilled in the art when this specification is read in conjunction with the attached drawings wherein like reference numerals are applied to like elements and wherein.

DETAILED DESCRIPTION OF THE PREFERRED EMBODIMENT

Figure 1:
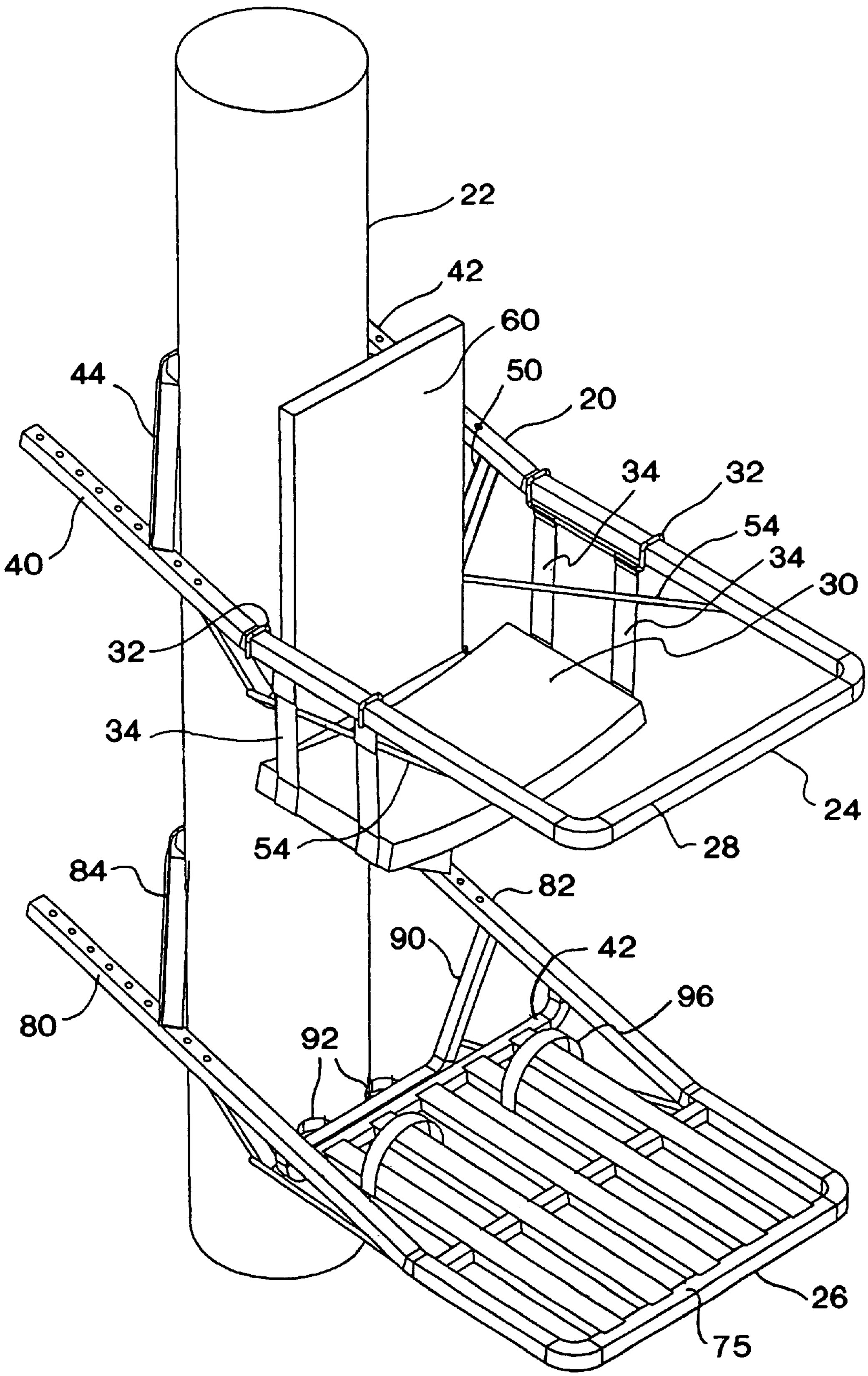
FIG. 1 is a perspective view of a climbing tree stand in accordance with the present invention with the seat in the outboard facing position.

Turning now to FIG. 1, a climbing tree stand 20 is attached to a vertical support element, such as a tree 22. While the climbing tree stand 20 is typically used with a tree, it will be readily appreciated that the stand 20 could also be used with any general substantially vertical support such as a pole or post. The climbing tree stand 20 includes a first or body-support assembly 24 and a second or fool-support assembly 26 which is disposed below the body-support assembly 24 during use. Both the body-support assembly 24 and the foot-support assembly 26 have a generally rectangular shape when viewed from above. Moreover, each of the body-support assembly 24 and the foot-support assembly 26 is structurally designed to independently support an outdoors man at an elevated position on the tree 22.

Now, the body-support assembly 24 has a peripheral tubular frame assembly 28 with first and second ends. The frame assembly 28 may be fabricated from 18 gauge, one-inch square, steel tubing which provides high strength, high stiffness, and low weight. Moreover, fabrication techniques including welding and bending are easily handled with such a material and such a cross-sectional configuration. The first end of the frame assembly 28 engages the tree 22. The frame assembly 28 includes a seat assembly 30 designed to be lightweight, reversible, and detachable from the frame assembly 28. The seat assembly 30 has a seat bottom portion suspended below the frame assembly 28 so that sides of the frame assembly 28 provide armrests for a seated observer. The seat bottom portion is preferably constructed such that the width of the seat bottom is slightly less than the space between sides of the frame assembly 28. A seat bottom width of about 20 inches has been found to be convenient and comfortable. In addition, the length of the seat bottom portion in a direction radially from the tree is selected to provide a comfortable seat surface. Generally, a seat length of about 12 inches has been found to be suitable. Additionally, the use of support engaging members such as seat hooks 32 provides the means to reverse the seat for facing toward the tree (inboard, see FIG. 2) or away from the tree (outboard, see FIG. 1) without fasteners. Moreover, since the seat assembly is easily detached from the body support assembly 24, the seat assembly eliminates the need for the observer to step over the seat while moving the seat assembly 30 from a position adjacent the tree to a position remote from the tree, as is required in some prior art devices.

The seat hooks may be fabricated from 0.250 inch steel wire, and coated with a plastic or rubberized coating to prevent noise the seat hooks move. As noted above, a thickness of about 0.050 inches is appropriate for the plastic or rubberized coating on the seat hooks. The portions of each seat hook that engage the frame assembly 28 should be constructed and arranged to mate closely with the outside surfaces of the tubing frame. It will be seen from the attached figures that each seat hook has a transverse portion with an integral hook element at each end. Each hook element is designed so that the distal end has a length corresponding to the height of the associated frame element, while the spacing between the distal end and the parallel segment of the hook element is slightly greater that the nominal width of the tubing used to fashion the frame. Furthermore, the transverse portion of the seat hook carrying the loop at the end of the web is positioned to be closely adjacent to the bottom surface of the frame. With that arrangement, the hook snaps over the frame such that there is a detent restraining the hook from free disengagement from the frame. This arrangement of hook members allows the seat assembly to slide on the supporting frame assembly for adjustment at any position along the supporting frame assemble. In addition, the detent arrangement permit the user to stand up and sit down repeatedly without requiring constant vigilance as to whether the hooks are securely positioned on the frame assembly. With the plastic coating on the hooks, noise is not generated whether the hooks are adjusted by sliding or whether the hooks are repositioned by detaching them from the frame at one place and attaching them to the frame at a second place. Furthermore, it is possible to simply detach the hook on one side of the seat assembly, move to a new position, slide the other side of the seat assembly along the frame to the new position, and then attach the hook which had been removed at the new location. Moreover, it should be apparent to those skilled in the art that round tubing and a corresponding round tube engaging feature of the seat hook is an acceptable design.

The seat assembly 30 includes two or more flexible tensile members such as straps fashioned from woven fabric webs 34, each web having an end looped around the corresponding seat hook 32. In the most preferred embodiment, the straps are continuous from side to side, beneath the seat bottom portion. Preferably, the seat straps 34 are fashioned from 1.5 inch wide woven polypropylene webbing. Polypropylene is relatively inexpensive, exhibits high tolerance to ultraviolet light without strength degradation, and provides some stretching characteristics which enhance its comfort. Nevertheless, while polypropylene is preferred, other materials such as cotton, canvas, nylon, dacron, and other synthetic materials may also be used, if desired. As noted above, it is possible to attach a hook member to each end of two straps so that four hooks are used. However, it is preferred that a single hook assembly be used on each side of the seat assembly, with two straps attached to each hook and with the hook providing a means for spacing the straps from one another. This arrangement reduces the likelihood that either side of the seat assembly is improperly connected with the frame assembly.

The top surface of the frame assembly 28 in the region of the seat assembly 50 defines a first generally horizontal reference plane.

As noted above, the first end of the frame assembly 28 engages the tree 22. To this end, the frame assembly 28 includes a pair of arms, 40, 42, each of which extends upwardly with respect to, and away from, the first generally horizontal reference plane so as to straddle the tree 22. Extending between the arms 40, 42 is a first support engaging bar 44. Typically, the arms 40, 42 are provided with correspondingly spaced attachment holes that permit the longitudinal position of the bar 44 on the arms 40, 42 to be adjusted so as to accommodate trees of different diameter, girth or gage. The bar 44 may be fashioned from L-shaped channel stock with a V-shape as seen from above. Such a V-shape causes engagement with the vertical support at two points separated laterally thereby enhancing the stability of the body support against lateral tipping. A suitable bar 44 may be fabricated from 1.25" by 1.25" equal-leg steel angle with a 0.125 inch thickness.

Figure 2:
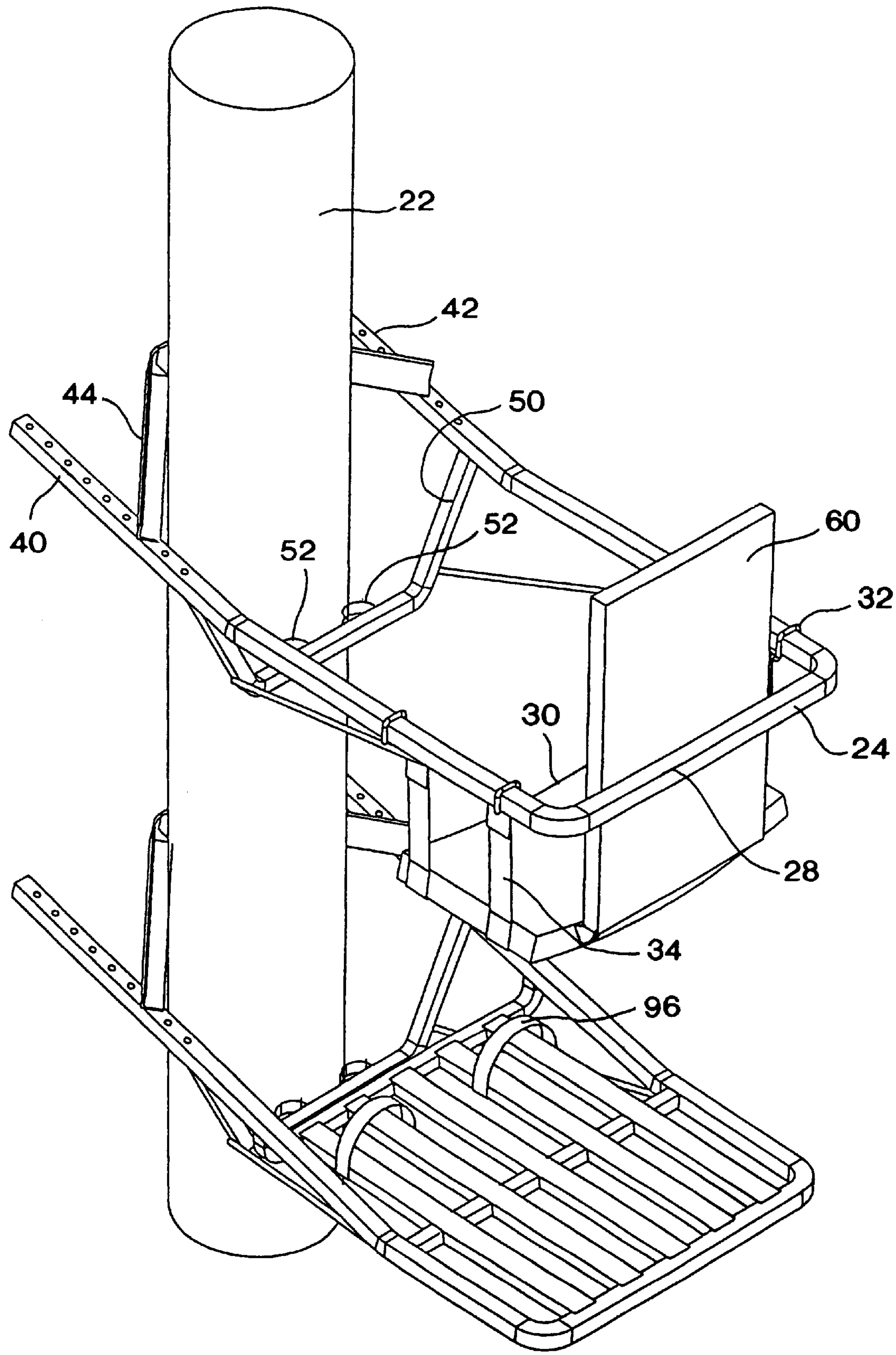
FIG. 2 is a perspective view of a climbing tree stand in accordance with the present invention with the seat in the inboard facing position.

A second part of the frame assembly 28 engages the tree 22 at a different elevation, spaced vertically from the bar 44. In particular, a support abutment 50 having a U-shape in elevation bears against the tree 22. Each end of the abutment 50 is attached to a corresponding one of the arms 40, 42. A transversely extending portion of the abutment 50 preferably carries a pair of bumper elements 52 (see FIG. 2) which are laterally spaced from one another so that the tree 22 is engaged therebetween. As with the V-shaped bar, the bumper elements 52 engage the vertical support at two points spaced laterally thereon so as to enhance the stability of the body-support assembly against lateral tipping. The bumper elements 52 are positioned below the first generally horizontal plane so that the bearing points between the bumper elements 52 and the tree 22 and bearing points between the bar 44 and the tree 22 are vertically spaced from one another and are disposed below and above the generally horizontal plane, respectively. As seen in FIG. 2, the bumper elements may be fashioned in an arcuate shape and attached to the U-shaped member.

To stiffen the connection between the U-shaped member 50 and the frame assembly of the body-support assembly 24, a pair of braces 54 are provided, one on each side of the assembly 24. Each brace 54 extends downwardly from the frame means 28 to the laterally extending portion of the abutment 50. These braces 54 may be fabricated from 5/16 inch diameter solid steel rods which provide an appropriate stiffness and relatively low weight.

Sitting for extended periods without back support can be uncomfortable. to overcome such discomfort, it may be desired to provide a back-support portion 60 on the seat assembly 30. The back-support portion 60 may be constructed using a 12 inch wide by 20 inch tall one-inch thick polyethylene foam pad for comfort both against the tree 22 and the transverse portion of the frame assembly 28.

Figure 3:
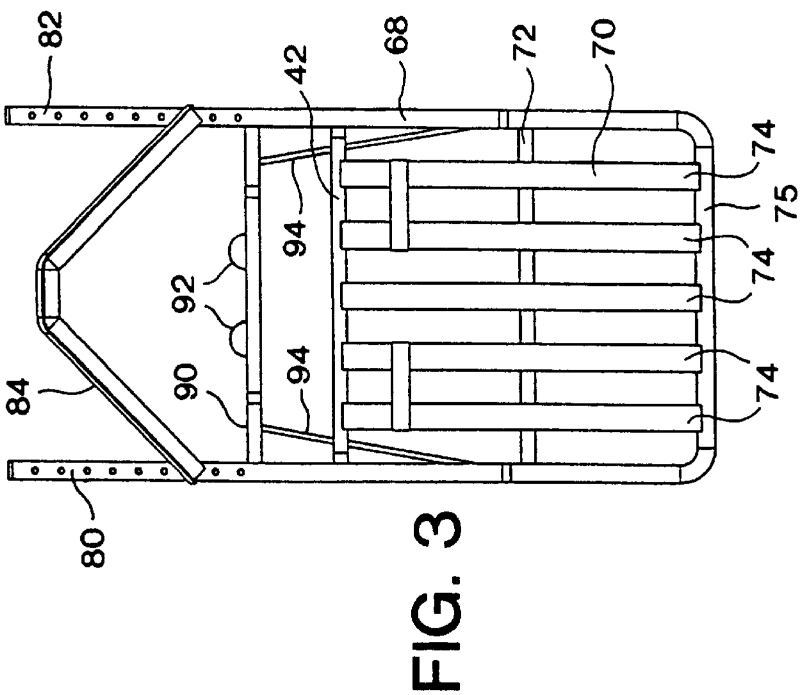
FIG. 3 is a top view of the foot support unit of FIG. 1.

The foot-support assembly 26 has many features and attributes which are similar to those of the body-support assembly 24. For example, (see FIG. 3), the foot-support assembly 26 has a generally rectangular shape when viewed from above. Moreover, the foot-support assembly 26 is structurally designed to independently support an outdoorsman at an elevated position on the tree 22.

Now, the foot-support assembly 24 has a peripheral tubular frame assembly 68 with first and second ends. As with the body-support assembly, the foot-support assembly may also be fashioned from one-inch square, 18 gauge, steel tubing. The first end of the frame assembly 68 includes a platform 70 designed to be lightweight and to be strong enough to support the weight of an outdoorsman while standing. More specifically, the platform assembly 70 may include a cross bar 72 extending from side-to-side of the frame assembly and suitably attached between parallel portions of the frame assembly 68 (see FIG. 2) so that the bar 72 is projected below the parallel parts of the frame for supporting the platform channel slats 74. Preferably, the cross bar 72 is attached by welding so that integrity of the fastening can be controlled at the time of manufacture. The platform assembly 70 may be completed by a plurality of generally parallel, support channels 74, each channel 74 having an end supported by the cross bar 42 and another end supported by the transverse portion of the frame assembly 68. Additionally, there is a transverse member 75 which supports the mid-span of the support channels 74. Preferably, the upper surface of each channel 74 may be extended at each end by a tab which is welded to the corresponding cross bar 42, transverse member 75, or transverse portion of the frame assembly 68.

The top surface of the frame assembly 68 in the region of the platform assembly 70 defines a second generally horizontal reference plane.

As noted above, the first end of the frame assembly 68 engages the tree 22. To this end, the frame assembly 68 includes a pair of arms 80, 82, each of which extends upwardly with respect to the first generally horizontal reference plane so as to straddle the tree 22. Extending between the arms 80, 82 is a first support engaging bar 84. Typically, the arms 80, 82 are provided with correspondingly spaced attachment holes that permit the longitudinal position of the bar 84 on the arms 80, 82 to be adjusted so as to accommodate trees of different diameter, girth, or gage. The bar 84 may be fashioned from L-shaped channel stock with a V-shape as seen from above. Such a V-shape causes engagement with the vertical support at two points separated laterally thereby enhancing stability of the body support against lateral tipping. As with the bar of the body-support unit, the bar 84 may be fabricated from 1.251" by 1.25" equal leg steel angle with a thickness of 0.125 inches.

A second part of the frame assembly 68 engages the tree 22 at different elevation, spaced vertically from the bar 84.

Figure 4:
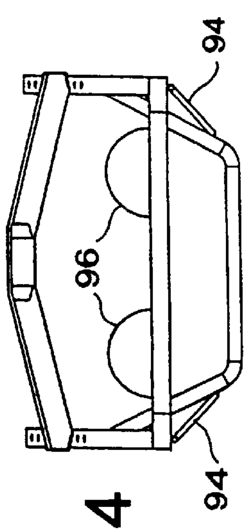
FIG. 4 is a front elevation view of the foot support unit of FIG. 3.
Figure 5:
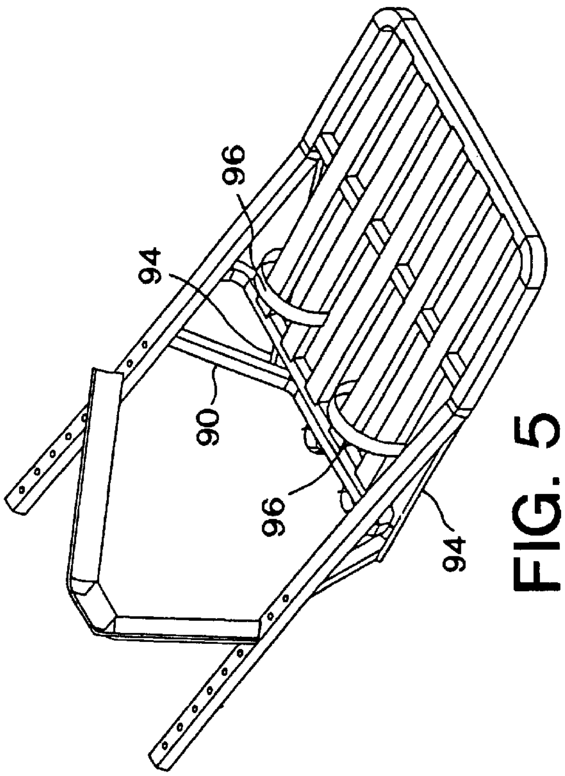
FIG. 5 is a perspective view of the foot support unit of FIG. 1.

In particular, a support abutment 90 (see FIG. 4) having a U-shape in elevation bears against the tree 22. Each end of the abutment 90 is attached to a corresponding one of the arms 80, 82. A transversely extending portion of the abutment 90 preferably carries a pair of bumper elements 92 (see FIG. 5) which laterally spaced from one another so that the tree 22 is engaged therebetween. As with the V-shaped bar, the bumper elements 92 engage the vertical support at two points spaced laterally thereon so as to enhance stability of the body-support assembly against lateral tipping. The bumper elements 92 are positioned below the first generally horizontal plane so that bearing points between the bar 84 and the tree 22 are vertically spaced from one another and are disposed below and above the generally horizontal plane, respectively. As seen in FIG. 1, the bumper elements may be fashioned in an arcuate shape and attached to the U-shaped member.

To stiffen the connection between the U-shaped member 90 and the frame assembly of the foot-support assembly 26, a pair of braces 94 (see FIG. 5) are provided, one on each side of the foot-support assembly 26. Each brace 94 extends downwardly from the frame means 68 to the laterally extending portion of the abutment 90. Here again, like the braces of the body-support unit, the braces 94 may be fabricated from 5/16 inch solid steel rod.

In order that the foot-support assembly 26 can be manipulated by the outdoorsman, the platform assembly 70 is provided with a pair of foot straps 96. Each end of the foot strap 96 may be secured one of the slats 74 to provide a loop which accommodates each foot of the outdoorsman. A suitable conventional adjustment device may be provided on each foot strap 96 so that the strap can be adjusted to the comfort of the outdoorsman during use. Alternatively, the straps can be adjusted on a more permanent basis by repositioning the strap attachment points. Such attachment points may be by screws or other threaded fasteners. Generally, each strap 96 would be adjusted to hold the outdoorsman's foot close to the platform 70 so that raising, lowering and tilting movements of the outdoorsman's foot will be transferred to the foot-support assembly 26.

The straps may be fashioned from suitable, conventional nylon web material. One-inch wide nylon webbing is preferred since it has a stiffness that causes the strap to stand up presenting a loop for the outdoorsman. In addition, other materials such as cotton, dacron, synthetic polymers, and the like can be used for the foot straps 96, or the strap 66 of the seat assembly.

Preferably, the body-support assembly 24 and the foot-support assembly 26 are fabricated from tubular steel stock. Certainly other structural materials such as aluminum could also be used; however, the additional stiffness available from a steel design as opposed to an aluminum design permits a stiffer unit to be fabricated from steel with only slightly more weight as an aluminum design. To minimize noise while improving stiffness and rigidity, connections between various parts of the climbing tree stand are effected by welding where possible.

Figure 11:
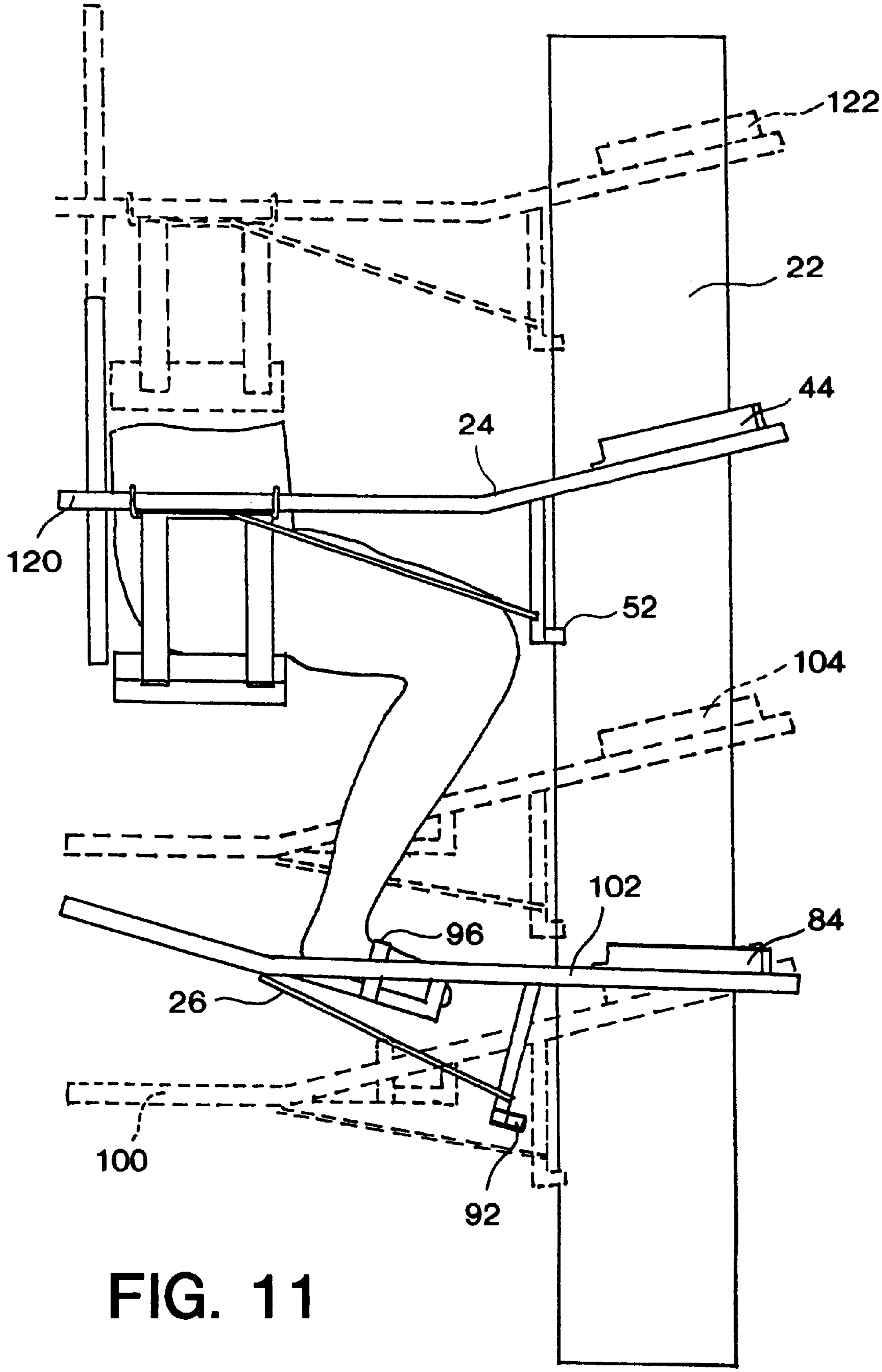
FIG. 11 is a side elevation view of the tree stand of FIG. 1 showing the tree climber during use and FIG. 12 is a perspective view of the seat.
Figure 12:
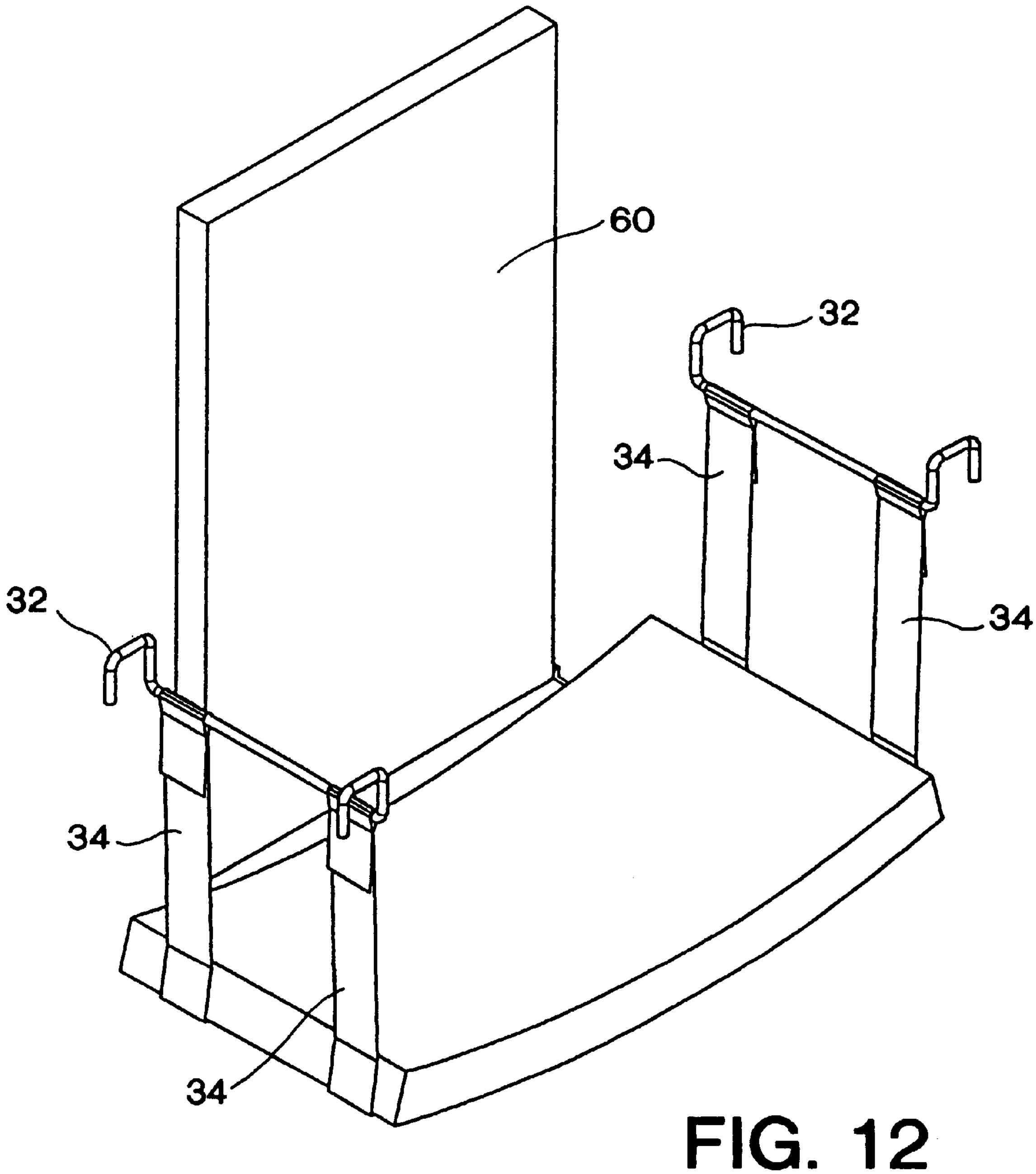

Operation of the climbing tree stand according to the present invention can be best understood from FIG. 11. Initially (see FIG. 6), the outdoorsman adjusts the position of the bar 44 of the body-support assembly 28 relative to the arms 40, 42 thereof so that the tree 22 is firmly engaged thereby with the seat assembly 30 in a slightly included posture relative to horizontal and sloping downwardly toward the tree 22. In this manner, as the girth of the tree diminishes with height, the seat assembly 30 will approach a horizontal posture. At the same time the bar 84 of the foot-support assembly 68 is likewise adjusted. Furthermore, the straps 96 are adjusted to snugly hold the outdoorsman's boot on the foot support platform 70.

The outdoorsman (see FIG. 7) then seats himself on the body-support assembly 24 in the initial position 120. At that time, the foot-support assembly 26 is located in the position 100 in full supporting engagement with the tree 22. After slipping his boots under the respective foot straps 96, while seated the outdoorsman lifts his legs to thereby pivot the foot-support assembly 26 about the bar 84 to a position (shown in solid lines) where the bearing elements 92 of the foot-support unit are spaced from the tree 22. Then, by further lifting his legs, the outdoorsman raises the foot-support unit 26) and lowers his legs so that the elements 92 again bear on the tree—albeit at a new higher elevation 104.

Then, the outdoorsman stands on the foot-support unit 26 in the upper position 104, and raises the body-support unit 24 to a new, higher position 122 on the tree 22 using his arms and hands. Here again, the unit 24 is tilted upwardly to disengage the elements 52, then bodily raised to the new elevation, and pivoted about the bar 44 so that the elements 52 again engage the tree 22.

The outdoorsman can now support his weight on the seat again.

To further raise the unit, i.e. climb the tree, the forgoing sequence of steps is repeated until the climbing tree stand has attained the desired elevation.

To descend the tree, the outdoorsman essentially repeats the foregoing steps in a reverse order. For example, he stands on the foot support, pivots the body-support unit upwardly, lowers it, and reengages the tree. Then, sitting on the body-support unit 24, he pivots the foot-support unit 26 upwardly, lowers it to a new position, and pivots it into engagement with the tree.

Figure 6:
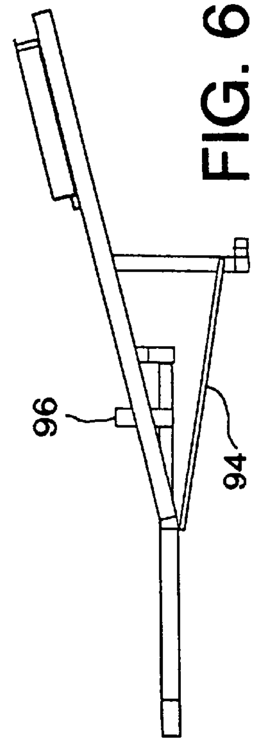
FIG. 6 is a side elevation view of the foot support unit of FIG. 3.
Figure 7:
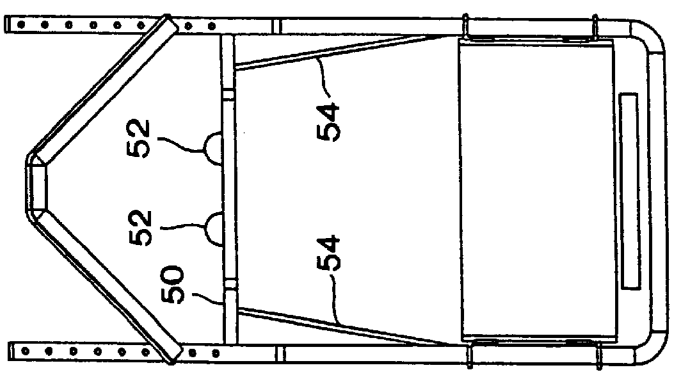
FIG. 7 is a top view of the body support unit of FIG. 1.
Figure 8:
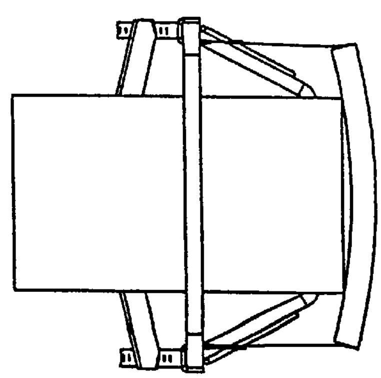
FIG. 8 is a front elevation view of the body support unit of FIG. 7.
Figure 9:
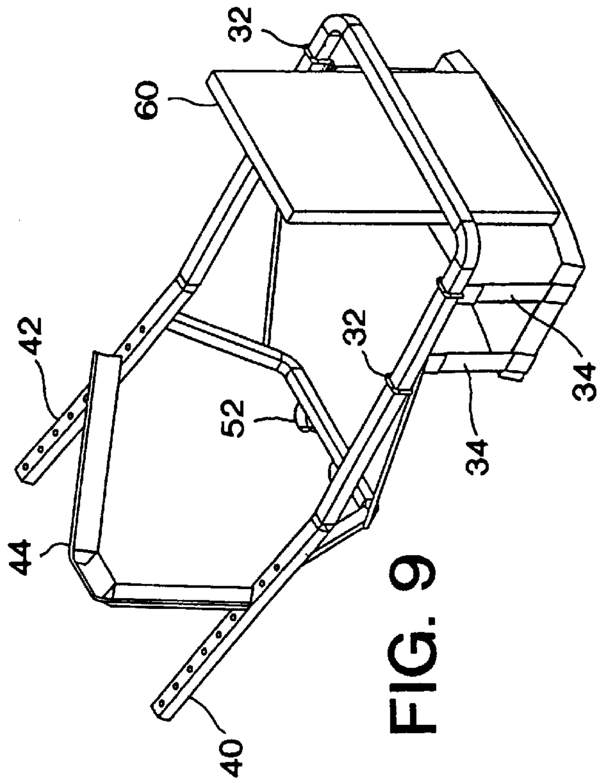
FIG. 9 is a perspective view of the body support unit of FIG. 1.
Figure 10:
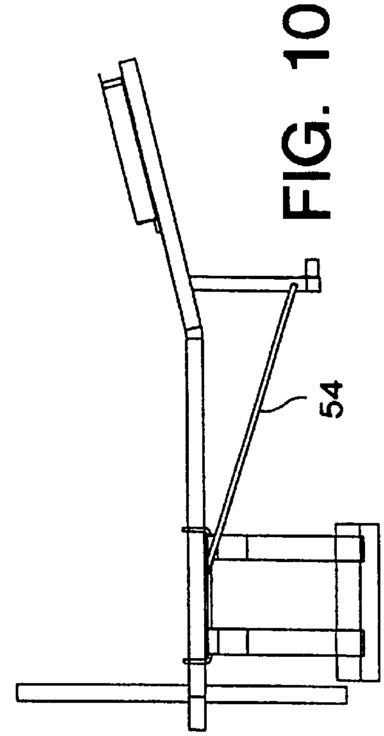
FIG. 10 is a side elevation view of the foot support unit of FIG. 7.

From a comparison of FIGS. 6 and 7, it can be seen that during use the outdoorsman's knees are unimpeded by any obstruction between the seat and the tree in the plane of the seat assembly. More particularly, the support bar 50 engages the tree at a location above the plane of the seat assembly. Thus, as the arcuate motion of the outdoorsman's thighs takes place, his knees can move freely without interference. Moreover, because the knee can move without interference in the plane of the seat, the seat can be positioned closer to the tree than would otherwise be possible. According the climbing tree stand can be shorter than previous designs, contributing to its light weight.

By fabricating the climbing tree stand from steel with welded connections, the climbing tree stand has a weight which is less than a comparable aluminum design. Moreover, due to more efficient utilization of material properties and cross-sections, the steel climbing tree stand can be spatially more compact than an aluminum design.

It will now be apparent that a climbing tree stand having an improved body-support assembly has been described which overcomes problems associated with the prior art devices. Moreover, it will be apparent to those skilled in this art that numerous modifications, variations, substitutions and equivalents exist for various features of the invention which do not materially depart from the spirit and scope of the invention. Accordingly, it is expressly intended that all such modifications, variations, substitutions, and equivalents which fall within the spirit and scope of this invention, as defined by the appended claims, shall be embraced thereby.

What is claimed is:

1. A climbing stand operable to climb a tree or other vertical support, comprising:

first means for supporting an operator in a seated position, including:

a first tubular frame means having first and second ends, and defining a first generally horizontal plane, a first support-engaging portion at the first end of the first tubular frame means, and a seat assembly including a generally planar seat bottom at the second end of the first tubular frame means, the seat being detachable from the first tubular frame means, and being reversible for facing both inward toward the tree and outward away from the tree, the seat bottom portion being spaced below the first support-engaging portion thereby defining a knee-accommodating space, wherein the seat assembly includes a back support pad, and wherein the seat assembly is suspended from the first support means by a plurality of flexible tensile elements, the first tubular frame means further including a pair of arms extending upwardly above the first generally horizontal plane and carrying a first support-engaging bar which extends between the first arms, and a support abutment positioned below the first generally horizontal plane so that the knee-accommodating space extends from the seat assembly to the vertical support; and second support means for supporting an operator in a standing position, including:

a second tubular frame means having first and second ends, a second support-engaging portion at the first end of the second tubular frame means, and a standing support portion at the second end of the second tubular frame means, defining a second generally horizontal plane, the second tubular frame means further including a second pair of arms extending upwardly above the second generally horizontal plane and carrying a second support-engaging bar which extends between the second arms, and a second support abutment positioned below the second generally horizontal plane.

2. The climbing stand of claim 1 wherein the flexible tensile elements have ends, and wherein the seat assembly is connected to the first support means by at least two tube engaging hooks attached to corresponding ends of the flexible tensile elements.

3. The climbing stand of claim 1 wherein the first tubular frame means is fashioned from steel tubing.

4. The climbing stand of claim 1 wherein the second tubular frame means is fashioned from steel tubing.

5. The climbing stand of claim 1 wherein the first support abutment is subjected to both bending and compression, while the first pair of arms are subjected to both bending and tension, whereby combined stresses act on those members.

6. A seat assembly for use in conjunction with a tree stand, comprising:

a seat bottom portion having a width exceeding its length;

a seat back portion, connected to the seat bottom portion, having a width substantially less than the width of the seat bottom portion, and a length substantially greater than the length of the seat bottom portion;

straps extending from the seat bottom portion, attached to the seat bottom portion, and having a loop in the end thereof;

hook members, having transverse portions disposed in the loops of the straps, and including a pair of hook elements; and each hook element having a shank with a nominal length, a bight perpendicular to the shank and the transverse portion, and a distal end parallel to the shank and extending from the bight.

7. The seat of claim 6 wherein each strap extends from both sides of the seat bottom portion and is substantially continuous in length, each end of each strap having a corresponding loop.

8. The seat of claim 6 wherein one hook member is provided on each side of the seat bottom portion, the loops of the straps on each side of the seat bottom portion being received on the transverse portion of one hook member, and the loops of the straps on the second side of the seat bottom portion being received on the transverse portion of a second hook.

9. The seat of claim 6 wherein the seat is padded.

* * * * *